US012153148B2

(12) United States Patent
Rose et al.

(10) Patent No.: US 12,153,148 B2
(45) Date of Patent: Nov. 26, 2024

(54) RADAR ALTIMETER AUGMENTED RECEIVER AUTONOMOUS INTEGRITY MONITORING IN AIRCRAFT

(71) Applicant: Reliable Robotics Corporation, Mountain View, CA (US)

(72) Inventors: Robert W. Rose, Mountain View, CA (US); Matthew T. Nehrenz, Mountain View, CA (US); Samuel P. Pullen, South San Francisco, CA (US)

(73) Assignee: RELIABLE ROBOTICS CORPORATION, Mountain View, CA (US)

( * ) Notice: Subject to any disclaimer, the term of this patent is extended or adjusted under 35 U.S.C. 154(b) by 43 days.

(21) Appl. No.: 17/538,671

(22) Filed: Nov. 30, 2021

(65) Prior Publication Data

US 2022/0365224 A1  Nov. 17, 2022

Related U.S. Application Data

(60) Provisional application No. 63/189,656, filed on May 17, 2021.

(51) Int. Cl.
*G01S 19/47* (2010.01)
*G01S 13/88* (2006.01)
(Continued)

(52) U.S. Cl.
CPC ............ *G01S 19/47* (2013.01); *G01S 13/882* (2013.01); *G01S 13/935* (2020.01); *G01S 19/07* (2013.01);
(Continued)

(58) Field of Classification Search
CPC ...... G01S 19/47; G01S 13/935; G01S 13/882; G01S 19/07; G01S 19/20; G01S 19/425; G01S 19/40; G08G 5/045
See application file for complete search history.

(56) References Cited

U.S. PATENT DOCUMENTS 5,583,774 A * 12/1996 Diesel .................... G01S 1/026
                                                  701/536
7,219,013 B1 * 5/2007 Young ................... G01C 21/165
                                                  701/472
(Continued)

FOREIGN PATENT DOCUMENTS

WO   WO-2016045703 A1 *  3/2016 ............ B64D 45/00

OTHER PUBLICATIONS

17538671_2023-11-08_WO_2016045703_A1_M.pdf, machine translation of WO-2016045703-A1 (Year: 2016).*
(Continued)

*Primary Examiner* — Timothy A Brainard
*Assistant Examiner* — Kenneth W Good
(74) *Attorney, Agent, or Firm* — FENWICK & WEST LLP

(57) ABSTRACT

An aircraft receives pseudorange input from a plurality of satellites of an augmentation system. Each pseudorange input includes a precise position solution and error data. The aircraft receives a high frequency measurement from an inertial navigation system. The aircraft applies the precise position solution, error data, and high frequency measurement to a set of parallel Schmidt extended Kalman filters to produce a corrected position solution and integrity data. The aircraft applies the integrity data to a receiver autonomous integrity monitoring system to produce a protection level for the corrected position solution. The aircraft performs an aircraft operation using the corrected position solution and protection level.

21 Claims, 6 Drawing Sheets

(51) Int. Cl.
  *G01S 13/935*  (2020.01)
  *G01S 19/07*  (2010.01)
  *G01S 19/20*  (2010.01)
  *G01S 19/40*  (2010.01)
  *G01S 19/42*  (2010.01)
  *G08G 5/04*  (2006.01)
(52) U.S. Cl.
  CPC ............ *G01S 19/20* (2013.01); *G01S 19/425* (2013.01); *G08G 5/045* (2013.01); *G01S 19/40* (2013.01)

(56) References Cited

U.S. PATENT DOCUMENTS

| | | | | |
|---|---|---|---|---|
| 9,784,844 | B2* | 10/2017 | Kana | G01S 19/20 |
| 10,197,678 | B1* | 2/2019 | Wang | G01S 19/20 |
| 2005/0182530 | A1 | 8/2005 | Murphy | |
| 2007/0222674 | A1* | 9/2007 | Tan | G01S 19/49 342/357.32 |
| 2007/0255495 | A1* | 11/2007 | Alexander | G01S 19/47 701/474 |
| 2008/0255715 | A1* | 10/2008 | Elchynski | G01S 19/15 701/16 |
| 2011/0320152 | A1* | 12/2011 | Vourc'H | G01C 21/165 702/92 |
| 2012/0019411 | A1* | 1/2012 | Trautenberg | G01S 19/41 342/357.24 |
| 2014/0074397 | A1 | 3/2014 | Vanderwerf | |
| 2014/0292574 | A1 | 10/2014 | Dunik et al. | |
| 2015/0247930 | A1 | 9/2015 | Scheitlin et al. | |
| 2016/0362192 | A1* | 12/2016 | Roux | G08G 5/0021 |
| 2017/0184723 | A1* | 6/2017 | Yun | G01S 19/08 |
| 2017/0350973 | A1* | 12/2017 | Dunik | G01S 19/47 |
| 2019/0056510 | A1* | 2/2019 | de Groot | G01S 19/20 |
| 2020/0158888 | A1* | 5/2020 | Ohev Zion | G01S 19/37 |
| 2020/0312170 | A1 | 10/2020 | Sherback et al. | |
| 2020/0379118 | A1* | 12/2020 | Reid | G01S 19/02 |
| 2021/0072407 | A1 | 3/2021 | Talbot et al. | |
| 2021/0116579 | A1* | 4/2021 | Rezaei | G01S 19/25 |
| 2021/0173090 | A1* | 6/2021 | Wu | G01S 19/072 |
| 2022/0146281 | A1* | 5/2022 | Becheret | G01C 21/165 |
| 2022/0252732 | A1* | 8/2022 | Dai | G01S 19/41 |

OTHER PUBLICATIONS

An Efficient Schmidt-EKF for 3D Visual-Inertial SLAM (2019), University of Delaware, Geneva, Patrick; Maley, James; Huang, Guoquan (Year: 2019).*
Geneva, P. et al. "An Efficient Schmidt-EKF for 3D Visual-Inertial Slam," *IEEE/CVF Conference on Computer Vision and Pattern Recognition*, Jun. 16-20, 2019, pp. 12105-12115.
United States Office Action, U.S. Appl. No. 17/538,657, filed May 17, 2023, 37 pages.
PCT International Search Report and Written Opinion, PCT Application No. PCT/US2022/29337, Mar. 8, 2023, 14 pages.
Azoulai, L. et al., "SBAS Error Modeling for Category I Autoland," Proceedings of the 25th International Technical Meeting of the Satellite Division of The Institute of Navigation (ION GNSS 2012), Sep. 2012, pp. 1334-1347.
Blanch, J. et al., "Baseline Advanced RAIM User Algorithm and Possible Improvements," IEEE Transactions on Aerospace and Electronic Systems, vol. 51, No. 1, Jan. 2015, pp. 713-732.
Blanch, J. et al., "Protection Levels after Fault Exclusion for Advanced RAIM," Journal of The Institute of Navigation, vol. 64, No. 4, Dec. 2017, pp. 505-513.
Clark, B. et al., "Alert Limits: Do we need them for CAT III?: Deriving GBAS Requirements for Consistency with CAT III Operations," Proceedings of the 19th International Technical Meeting of the Satellite, Sep. 2006, pp. 3070-3081.
"EU-U.S. Cooperation on Satellite Navigation: Working Group C—ARAIM Technical Subgroup, Milestone 3 Report," Final Version, Feb. 25, 2016, pp. 1-121.
Felux, M., "Total System Performance of BAS-based Automatic Landings," PHD Thesis, Jul. 25, 2018, pp. 1-155.
Groves, P.D., "Principles of GNSS, Inertial, and Multisensor Integrated Navigation Systems," Second Edition, 2013.
Pullen, S., "Proposal for Tighter WAAS Commitments on Broadcast UDRE and GIVE," Reliable Robotics Corp., Mountain View, CA, R100425-00 Rev 0, May 5, 2020, pp. 1-7.
Shively, C. et al., "Safety Concepts for Mitigation of Ionspheric Anomaly Errors in GBAS," ION NTM 2008, Jan. 2008, pp. 367-381.
Shively, C., "Rationale for why 0.2 or 0.05 is safe for WAAS—SRMD," Apr. 18, 2007, [e-mail], pp. 1-2.
Stanford GPS Lab, "Matlab Algorithm Availability Simulation Tool (MAAST), Stanford GPS Laboratory website," Dec. 4, 2020, pp. 1-2, [Online] Retrieved from the Wayback Machine <URL: http://web.archive.org/web/20201204114907/https://gps.stanford.edu/resources/tools/maast>.
U.S. Department of Defense, "Global Positioning System Standard Positioning Service Performance Standard (GPS SPS PS)," 5th Ed, Apr. 2020, pp. 1-196.
U.S. Department of Transportation, "Criteria for Approval of Category III Weather Minima for Takeoff, Landing and Rollout," Washington, DC, FAA AFS-400, Document AC 120-28D, Jul. 1999, pp. 1-103.
U.S. Department of Transportation/Federal Aviation Administration, "United States Standard for Performance Based Navigation (PBN) Instrument Procedure Design." Order 8260.58A CHG 2, Sep. 11, 2018, pp. 1-88.
Walter, T. et al., "Vertical Protection Level Equations for Dual Frequency SBAS," Proceedings of the 23rd International Technical Meeting of The Satellite Division of the Institute of Navigation (ION GNSS 2010), Sep. 2010, pp. 2031-2041.
Walter, T., "Personal Communication," Apr. 19, 2020, [e-mail], pp. 1-7.
Xie, G. et al., "Integrity Design and Updated Test Results for the Stanford LAAS Integrity Monitor Testbed," Proceedings of the 57th Annual Meeting of The Institute of Navigation, Jun. 2001, pp. 681-693.
United States Office Action, U.S. Appl. No. 17/538,657, filed Sep. 21, 2023, 30 pages.
United States Office Action, U.S. Appl. No. 17/538,657, filed Mar. 28, 2024, 9 pages.
Pullen, S. et al. "SBAS and GBAS Integrity for Non-Aviation Users: Moving Away from Specific Risk," *International Technical Meeting of The Institute of Navigation,* Jan. 24-26, 2011, 13 pages.

* cited by examiner

RADAR ALTIMETER AUGMENTED RECEIVER AUTONOMOUS INTEGRITY MONITORING IN AIRCRAFT

CROSS-REFERENCE TO RELATED APPLICATION

This application claims the benefit of U.S. Provisional Application No. 63/189,656, filed May 17, 2021, which is incorporated by reference.

BACKGROUND

This disclosure relates generally to aircraft localization and more specifically to cross-checking localization accuracy, thereby improving "worst-case" error bounds during aircraft operations such as takeoffs and landings.

Successful takeoff, landing, and other phases of flight require that the position and orientation of an aircraft with respect to a landing or takeoff site, such as a runway, be known to a high degree of certainty. Current systems for navigation (e.g., navigation to or in the vicinity of an airport) require installation and maintenance of expensive apparatus, lack the precision required for automated flight procedures, are not sufficiently reliable, and are prone to interference. Existing forms of receiver autonomous integrity monitoring (RAIM) assess the integrity of global positioning system (GPS) signals in safety-critical applications, such as aircraft operations. However, RAIM generally achieves protection levels too imprecise for many operations, such as autonomous aircraft takeoff or landing.

SUMMARY

In an embodiment, a Receiver Autonomous Integrity Monitoring (RAIM) system of an aircraft Global Navigation Satellite System (GNSS) (e.g., Global Positioning System (GPS)) is augmented using a Satellite-Based Augmentation System (SBAS) (e.g., Wide Area Augmentation System (WAAS)) data and inertial navigation system (INS) data to produce position solutions with reduced horizontal and/or vertical protection levels. SBAS-corrected pseudorange inputs received from SBAS satellites, as well as INS data, are applied to a set of tightly-coupled filters (e.g., parallel Schmidt extended Kalman filters (Schmidt EKFs)) whose outputs are monitored by the RAIM system. The set of filters includes one more filter than there are satellites (e.g., GNSS satellites and/or SBAS satellites) used for ranging. All but one filter in the set excludes pseudorange inputs, each from a different GNSS or SBAS satellite, and the last filter includes pseudorange inputs from all the GNSS and SBAS satellites.

In this manner, the GNSS system produces high accuracy position fixes with low latency. During the final phase of landing, the filter set additionally incorporates radar altimeter data to further reduce the vertical protection levels and reduce the decision height of the aircraft, which can enable autonomous landing operations by the aircraft.

Incorporating SBAS corrections and integrity information and using a set of tightly coupled filters provides a technique with solution separation based RAIM for fault detection among the employed satellites. Protection level computation by the RAIM system for each axis produces tighter bounds, i.e., protection levels that bound the unknown error of the position solution at low probabilities to smaller values. Tighter protection levels provide for improved aircraft operations, such as autonomous takeoff or landing, and higher availability of these operations.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. System Overview

An aircraft uses position solutions to determine its location with reference to the Earth. The aircraft uses these position solutions when performing aircraft operations, such as takeoff, en route flight, and landing. The utility of these position solutions increases with improved accuracy and precision, particularly when this improved performance is known or at least bounded in real-time. This is particularly true for autonomously-guided aircraft, where a pilot or external observer may not be able to perform saving operations if autonomous systems fail. As aircraft move with high speed, they typically need position solutions to be updated very frequently for these position solutions to be useful, yet high-frequency position solutions are more prone to error. As described herein, a GPS system of an aircraft is augmented to provide for accurate and high frequency position solutions that can be utilized for purposes such as autonomous landing.

Though various techniques are described herein with reference to a GPS system, alternative GNSS systems may be employed without deviating from the principles set forth herein. For example, other techniques may employ GLONASS, Galileo, Beidou, Quasi-Zenith Satellite System (QZSS), and/or other GNSS systems without departing from the principles set forth herein. Likewise, though various techniques are described herein with reference to a WAAS system, alternative augmentation systems (e.g., SBAS systems) may be employed without deviating from the principles set forth herein.

Figure 1B:
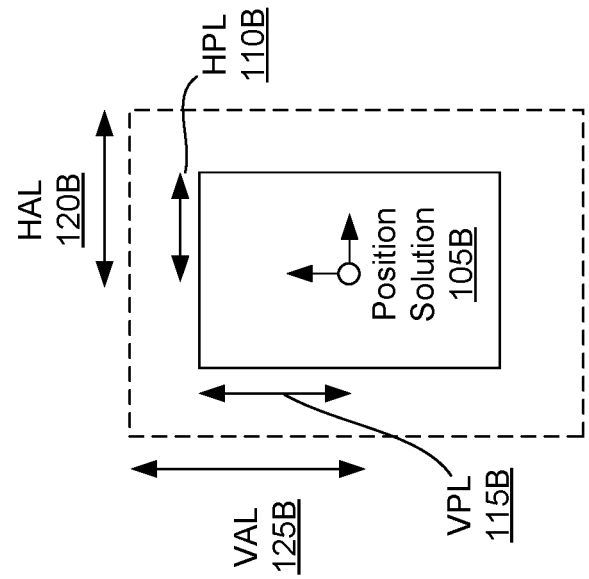
FIG. 1B is an illustration of protection levels and alert limits for a position solution, according to a second embodiment.
Figure 1A:
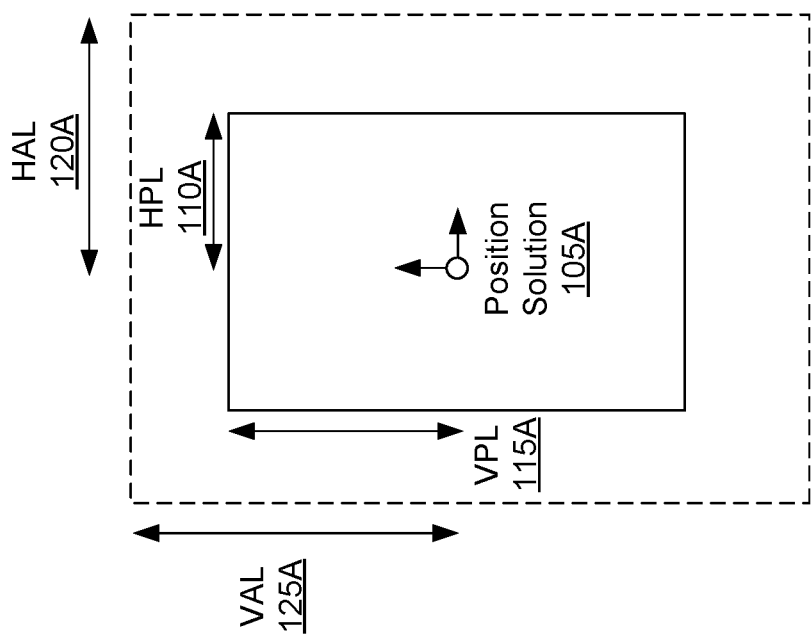
FIG. 1A is an illustration of protection levels and alert limits for a position solution, according to a first embodiment.

FIG. 1A is an illustration of protection levels and alert limits for a position solution, according to a first embodiment. A position solution 105A has a horizontal protection level (HPL) 110A and a vertical protection level (VPL) 115A. The position solution 105A also has a horizontal alert limit 120A and a vertical alert limit 125A. The HPL 110A and VPL 115A are statistical bounds on position error in their respective dimensions, with the HPL 110A acting as a two-dimensional radius about the aircraft (shown in one dimension in the figure) and the VPL 115A applying to space above and below the aircraft. Each protection level bounds position error within a specified confidence expressed as a probability, e.g., the true position of the aircraft in a particular dimension is within the space defined by the protection level with a probability of 0.99999, representing 99.999% confidence. Each protection level is calculated by the aircraft (e.g., a RAIM system of the aircraft) based on data including error estimates on measurements such as pseudoranges received from a set of satellites. As such, measurements with smaller error estimates lead to smaller protection levels, and measurements with greater error estimates lead to larger protection levels.

If the aircraft receives low quality measurements with large error estimates, the generated protection levels may grow large enough that they exceed the horizontal alert limit (HAL) 120A or the vertical alert limit (VAL) 125A. If one or more of the aircraft's protection levels exceed the respective alert limits for longer than a required "time to alert," e.g., 2 seconds, the aircraft attempts to exclude faulty measurements causing this situation or, failing that, issues an alert. Depending upon the embodiment, the aircraft may exclude faulty measurements before the time to alert, e.g., upon obtaining measurements with error estimates exceeding a threshold error value (which may be the alert limit, according to one embodiment). Depending upon the embodiment, the aircraft may also alert before the time to alert when certain conditions are met, e.g., when the aircraft receives a threshold consecutive number of measurements (e.g., one, two, or three) having error estimates of at least a threshold error value (e.g., twice the alert limit).

The aircraft may issue an alert to a pilot of the aircraft, or to an internal system of the aircraft to initiate corrective action, e.g., abort a landing attempt and conduct a "missed approach" operation. Alert limits are issued for each type of aircraft operation and specify the maximum level of navigation error in each dimension beyond which unacceptable ("unsafe") hazards will occur to aircraft and their occupants.

FIG. 1B is an illustration of protection levels and alert limits for a position solution, according to a second embodiment. The position solution 105B is more accurate in that it has a smaller HPL 110B and VPL 115B than position solution 105A. Techniques described herein provide for smaller protection levels, which in turn allow for operations with tighter alert limits, such as HAL 120B and VAL 125B. For example, position solution 105A may have an HPL 110A of 15 meters, a VPL 115A of 25 meters, an HAL 120A of 40 meters, and a VAL 125A of 35 meters. In contrast, position solution 105B may have an HPL 110B of 10 meters, a VPL 115A of 15 meters, an HAL 120B of 15 meters, and a VAL 125B of 20 meters. As such, an aircraft with position solution 105B can perform more demanding aircraft operations (i.e., those with tighter requirements on position errors) using the more accurate position solution 105B, such as autonomous landing, which an aircraft using position solution 105A cannot perform.

Figure 1C:
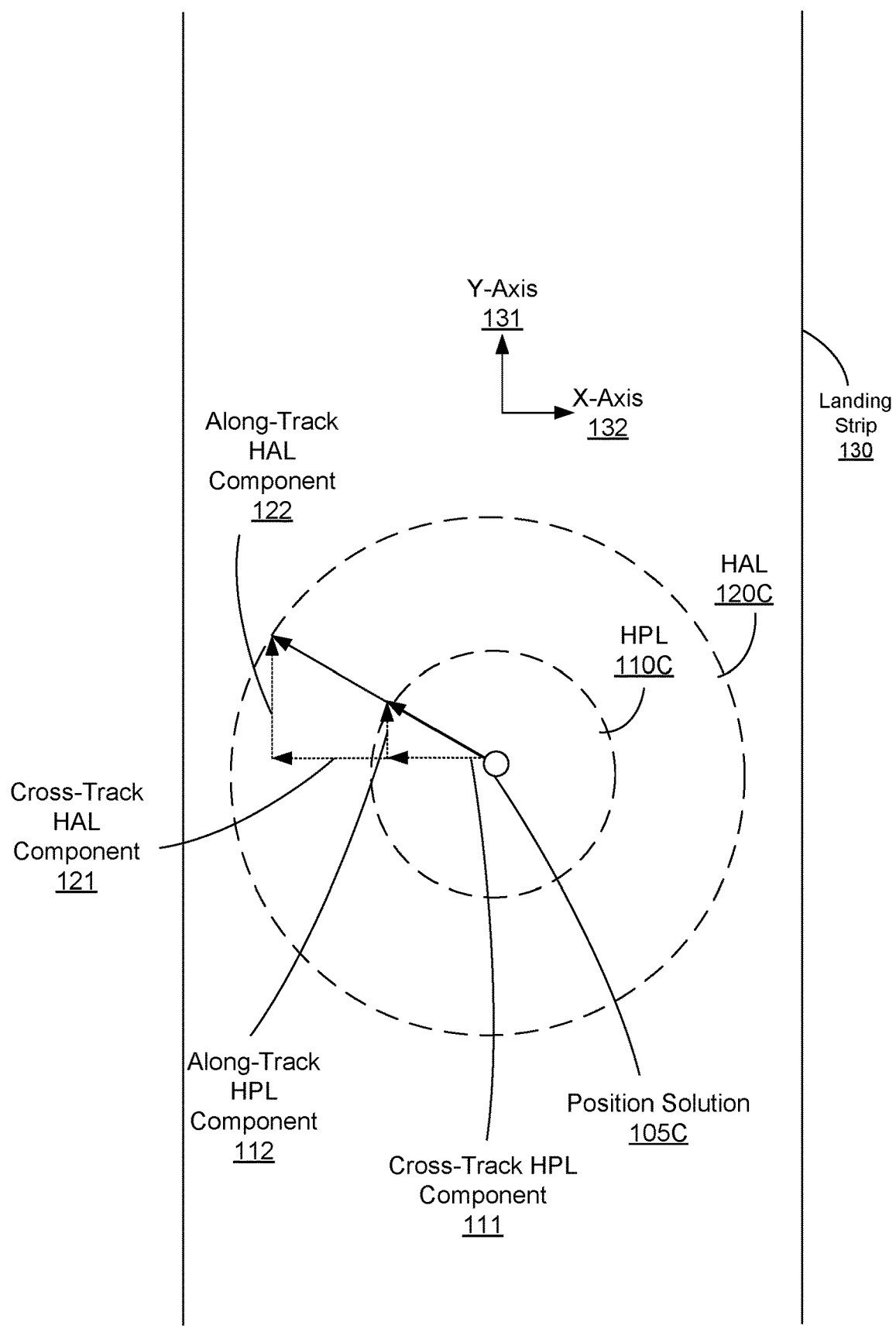
FIG. 1C is an illustration of protection levels and alert limits for a position solution, according to a third embodiment.

FIG. 1C is an illustration of protection levels and alert limits for a position solution, according to a third embodiment. The position solution 105C has an HPL 110C that is split into an "along-track" HPL component 112 that is parallel to the long axis of a landing strip 130 (e.g., Y-Axis 131) and a "cross-track" HPL component 111 that is perpendicular to the long axis of a landing strip (e.g., parallel to the X-Axis 132 and perpendicular to the Y-Axis 131). Similarly, the position solution 105C has an HAL 120C that is split into an "along-track" HAL component 122 that is parallel to the long axis of a landing strip 130 and a "cross-track" HAL component 121 that is perpendicular to the long axis of a landing strip.

In an embodiment, the aircraft divides the HPL 110C and HAL 120C into respective components and similarly divides an error estimate of the position solution 105C to more accurately evaluate the aircraft's location with respect to the landing strip 130. Landing strips 130 are generally much longer than they are wide, such as (e.g.) 2,500 meters long but only 50 meters wide. The safe touchdown zone specified by the Federal Aviation Administration for precision landings under low-visibility conditions reflects this by being 2700 ft long (in the along-track direction, parallel to the long axis of the landing strip) but only 70 ft wide (in the cross-track direction, perpendicular to the long axis of the landing strip). As a result, there is much greater room for error in the along-track direction than in the cross-track direction when positioning a landing aircraft over and onto the landing strip 130. Separating the along-track and cross-track components of the horizontal position solution, protection level, and alert limit as shown in FIG. 1C prevents large (but tolerable) error bounds in the along-track direction from preventing landing operations unnecessarily. As explained above, the cross-track component of HAL 121 is much more constraining than the along-track component 122. Thus, aircraft are allowed to initiate landing operations if the entirety of the cross-track HPL component 111 is within the cross-track HAL component 121 (which is itself within the bounds of the landing strip 130), but the along-track constraint is much looser and (in practice) non-limiting.

Figure 2:
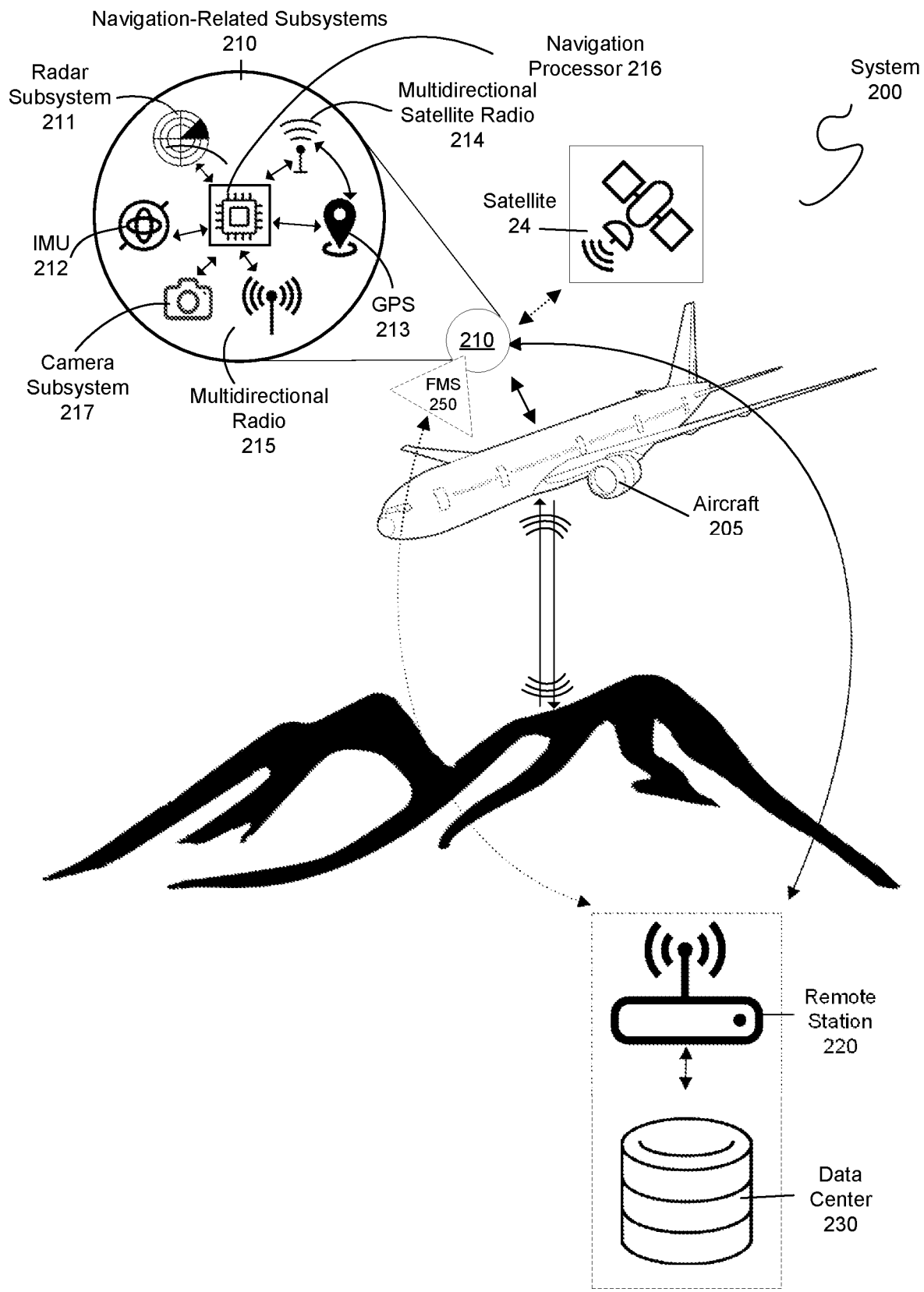
FIG. 2 is a simplified diagram of an aircraft environment for augmented RAIM, according to one embodiment.

FIG. 2 is a simplified diagram of an aircraft environment for augmented RAIM, according to one embodiment. The aircraft environment is a system 200 for localization (e.g., in relation to a landing site and/or takeoff site, or in relation to other phases of flight), in accordance with one or more embodiments. The system 200 can include one or more subsystems 210 for localization and/or navigation that are coupled to (e.g., mounted to, onboard, within, etc.) an aircraft 205, where the subsystems are described in more detail below. The system 200 can also optionally include a remote station 220 in communication with a data center 230 at a location remote from the aircraft 205, such that some computing functions can be performed at a location remote from the aircraft 205. The system 200 can also include a flight management system (FMS) 250 including interfaces between the remote station 220 to the FMS 250 and/or interfaces between the subsystems 210 and the FMS 250. The system 200 provides structures, subsystem interfaces, and operation modes useful for implementation of piloted and automated flight operations, including operations associated with techniques described in more detail below.

The system 200 functions to augment position estimation during flight operations (e.g., takeoff operations, landing operations, other flight operations) across multiple subsystems (e.g., GPS-associated subsystems, such as a RAIM system) associated with an aircraft 205. Improved position solutions, especially during terminal flight operations, can improve decision making (e.g., automated decision making, guidance provided to a human flight operator, instructions provided to subsystems for automating flight control of the aircraft, etc.).

The system can exploit various global navigation satellite system (GNSS) augmentation systems and/or additional systems from which it receives position data, depending upon the embodiment. For example, depending upon the embodiment, the aircraft may receive supporting data (e.g., corrections to measured pseudoranges and bounds on errors in these corrections) originating from one or more of an SBAS, a WAAS, a Ground-based Augmentation System (GBAS), a Precise Point Positioning (PPP) network, a standalone or networked real time kinematic (RTK) positioning system, an instrument landing system (ILS) such as a Category-I ILS, Category-II ILS, or Category-III ILS, a microwave landing system (MLS), or a computer vision system of the aircraft.

In some embodiments, the system 200 can also correct for error drift in localization subsystems and/or allow localization subsystems to operate continuously when one or more components of the navigation subsystems are unavailable. In some embodiments, the system 200 can also perform automated flight operations based on improved localization accuracy resulting from augmented position estimation. In some embodiments, and in relation to improved operation, the system 200 improves "worst-case" error bounds (i.e., the protection levels described above) of a position solution.

1.1 System—Aircraft

The aircraft 205 shown in FIG. 2 is a fixed-wing aircraft. The aircraft has flight control surfaces for aerodynamically affecting flight of the aircraft relative to a pitch axis (i.e., a transverse axis), a yaw axis (i.e., a vertical axis), and a roll axis (i.e., longitudinal axis) of the aircraft. Flight control surfaces can include one or more of: ailerons, flaps, elevators, stabilizers (e.g., horizontal stabilizers), rudders, spoilers, slats, air brakes, vortex generators, trim surfaces, and any other suitable control surfaces. The aircraft also has a power plant for generation of mechanical power associated with flight operations, and in variations, the power plant can include one or more of: a piston engine (e.g., in-line engine, V-type engine, opposed engine, radial engine, etc.), a gas turbine engine (e.g., turbojet engine, turbofan engine), a pulse jet, a rocket, a Wankel engine, a Diesel engine, an electric engine, a hybrid engine, and any other suitable power plant system. The power plant is coupled to an energy source (e.g., fuel system, battery, solar cell, etc.) and a cooling system (e.g., forced convection cooling system, liquid cooling system, oil cooling system, etc.) for aircraft performance in flight.

While this description uses a fixed-wing aircraft as an example, the principles described herein are equally applicable to variations of the aircraft 205 including form factors and/or control surfaces associated with one or more of: rotorcraft, gliders, lighter-than-air aircraft (e.g., airships, balloons), powered-lift aircraft, powered-parachute aircraft, weight-shift-control aircraft, rockets, and/or any other suitable types of aircraft. Still other variations of the system 200 can involve terrestrial vehicles, water vehicles, amphibious vehicles, or other non-aircraft vehicles.

1.2 System—Subsystems for Localization, Navigation, and/or State Detection

The subsystems 210 include subsystems capable of generating data associated with dynamic states of the aircraft, environments about the aircraft, operation states of aircraft systems (e.g., power plant systems, energy systems, electrical systems, etc.), and any other suitable systems associated with operations of the aircraft on the ground or in flight. The subsystems 110 also include subsystems capable of transmitting data to and from the aircraft 205 and other remote systems.

As such, the subsystems 210 include components that generate and receive information generated from subsystems coupled to the aircraft 205, as well as a navigation processor 216 providing computational infrastructure (e.g., processing components, communication buses, memory, etc.) for communicating data between the subsystems. The navigation processor 216 thus provides architecture for communication of data generated by subsystems, for communication with other systems remote from the aircraft 205, for control of subsystems, and/or for control of the aircraft. The navigation processor 216 can also include architecture for reporting navigation-associated information to an operator (e.g., pilot) of the aircraft 205, for instance, in manual operation modes or semi-manual operation modes where navigation states can be displayed to the operator (e.g., through an electronic flight instrument system). The subsystems 210 can thus include specialized computer components designed for use in an aircraft, and in particular, can include components that are customized in configuration relative to each other and customized in relation to processing of signals received and processed to perform aspects of the techniques described below.

Information routed between the subsystems 210 and other systems remote from the aircraft 205 can optionally be routed through a flight management system (FMS) 250, configured for automation of flight tasks in relation to a flight plan. The FMS 250 processes navigation database information (e.g., information associated with waypoints, airways, navigation aids, airports, runways, departure procedures, arrival procedures, holding patterns, etc.), aircraft subsystem statuses, and outputs of other subsystems (e.g., radar subsystems, sensor subsystems) and determines one or more desired flight paths based on the information. The FMS can cooperate with the navigation processor 216 in receiving outputs of other subsystems of the subsystems 210 and/or transmitting control instructions to affect operational states of other components of the subsystems 210. The FMS 250 can also include or interface with other control systems (e.g., of an autopilot) to transform calculated flight information into instructions for control of control surfaces of the aircraft 205 including one or more of: ailerons, flaps, elevators, stabilizers (e.g., horizontal stabilizers), rudders, spoilers, slats, air brakes, vortex generators, trim surfaces, and any other suitable control surfaces.

1.2.1 System—Radar Subsystem

As shown in FIG. 2, the subsystems 210 include a radar subsystem 211 mounted to the aircraft, where the radar subsystem 211 includes radar transmit and receive antennas configured to enable detection of features of objects associated with a flight path of the aircraft. Radar transmit antennas of the radar subsystem 211 emit in the radio portion of the electromagnetic spectrum. Radar transmit antennas can further transmit signals that have a wavelength, gain, carrier, pulse width, pulse repetition frequency, staggering, and any other suitable characteristic suitable for generation of return signals that can be processed to determine features of objects interacting with the transmitted signals. Radar receive antennas of the radar subsystem 211 receive in the radio portion of the electromagnetic spectrum and receive signals that have an effective aperture and gain. Radar receive antennas can be coupled with elements (e.g., filters, polarizers, etc.) configured to prevent or otherwise mitigate undesired return signals associated with clutter, interference, noise, and/or jamming. Radar receive antennas can additionally or alternatively be coupled with elements (e.g., attenuators) configured to prevent saturation of the receive elements from a return signal. Radar transmit and/or receive components can, however, be coupled to any other suitable elements (e.g., waveguides, duplexers, etc.) that refine aspects of the emitted and/or received signals in a desired manner. Furthermore, radar antennas can include phased array configurations (e.g., passive phased array configurations, active phased array configurations, conformal phased array configurations, etc.) or other suitable antenna configurations.

The radar subsystem 211 can have one or more radar antennas structurally mounted to the aircraft and positioned so as to transmit signals away from a ventral surface of the aircraft 205 and/or receive signals transmitted or reflected toward the ventral surface of the aircraft. As such, radar antennas can be configured to receive signals from terrain and/or other objects below the aircraft during flight. Antennas of the radar subsystem 211 can alternatively be positioned relative to the aircraft in any other suitable manner (e.g., coupled to a non-ventral surface) in order to receive signals that can be processed to determine locations of the aircraft in flight.

Multiple radar antennas can be used for system redundancy (e.g., in the event a subset of antennas are compromised). Multiple radar antennas can also be used for providing different positions from which to emit radar signals toward objects of interest and/or for receiving radar signals from objects of interest, depending upon orientation of the aircraft 205 or characteristics of objects from which return signals are generated.

The antenna(s) of the radar subsystem 211 can be coupled to an exterior portion of the aircraft 205. One or more antenna(s) of the radar subsystem 211 can alternatively be coupled to an interior portion of the aircraft 205 and extend through a wall of the aircraft 205 to transmit and/or receive signals outside of the aircraft 205. Mounting positions are associated with desired directionality in relation to transmitted radar signals and/or received signals, in relation to relative orientations between the aircraft and objects used to determine the location(s) of the aircraft 205 during flight. The antenna(s) of the radar subsystem 211 can thus be fixed in position. The antenna(s) of the radar subsystem 211 can alternatively be adjustable in position and/or rotation based on orientations of the aircraft in flight. The radar subsystem 211 can thus include actuators coupled to the antenna(s) of the antenna subsystem 211 and/or position encoders coupled to the actuators, in relation to electronic control of antenna positions.

The radar subsystem 211 produces output signals that have a characteristic resolution and power, and from which transmit time-related parameters (e.g., time between transmission of a signal and receipt of a return signal), distance-related parameters (e.g., distance between the aircraft and an object in relation to altimeter functions, other distance-related functions, etc.), reflector object parameters (e.g., shape, surface features, etc.), scattering parameters, frequency modulation parameters, speed-related parameters (e.g., change in distance between the aircraft and an object), and/or any other suitable parameters can be extracted to determine a location of the aircraft during flight.

Furthermore, while images are described, the radar subsystem 211 can be supplemented with or otherwise replaced with a light detection and ranging (LIDAR) subsystem that includes light emission elements and/or light sensors for receipt of optical signals indicative of features about the aircraft (e.g., in relation to light reflective objects, light scattering objects, light absorbing objects, light responsive objects, etc.), where the optical signals can be processed to determine locations of the aircraft 205 during flight, in relation to the techniques described in below. As such, the system 200 can implement other sensors that provide height information related to positions of the aircraft 205, in order to augment navigation of the aircraft 205 in space.

1.2.2 System—Camera Components

As shown in FIG. 2, the subsystems 210 include a camera subsystem 217 mounted to the aircraft, where the camera subsystem 217 includes sensors configured to capture features of the environment (e.g., takeoff environment, landing environment, flight environment, etc.) of the aircraft 205, features of objects in the vicinity of the environment of the aircraft, features of calibration objects along a path of operation of the aircraft, features of other objects along a path of operation of the aircraft, and/or any other suitable object aspects to facilitate automated landing of the aircraft at a desired landing site.

Sensors of the camera subsystem 217 can utilize the visible spectrum. Sensors of the camera subsystem 217 can additionally or alternatively include longwave infrared (LWIR) sensors (e.g., sensors operating in the 8-12 μm band) or others upon other bands of light. The camera subsystem 217 can also include optical elements (e.g., lenses, filters, mirrors, apertures etc.) for manipulating light reaching the sensors of the camera subsystem 217. In relation to detection of airport lighting systems for landing site localization relative to airport lighting, the camera subsystem 217 can include one or more filters optically coupled to the sensors and configured to detect spectra of light emitted from airfield landing systems (e.g., lighting systems in accordance with Federal Aviation Administration Advisory Circular 150/5345-46E). Variations of the camera subsystem 217 can, however, have any other suitable sensor types and/or optical elements associated with visible spectra and/or non-visible spectra electromagnetic radiation.

The camera subsystem 217 can have one or more cameras structurally mounted to the aircraft and positioned so as to enable detection of the landing site or other site relevant to operation of the aircraft, as the aircraft traverses through space. Multiple cameras can be used for system redundancy (e.g., in the event a subset of cameras have occluded optical elements) and/or for providing different field of view options depending on approach path and orientation to a landing site. The camera(s) of the camera subsystem 217 can be coupled to an interior portion of the aircraft 205 or can be coupled to an exterior portion of the aircraft 205. Mounting positions are associated with desired flight paths to a landing site (e.g., approach patterns, instructions from air traffic control, etc.). As such, the camera subsystem 217 can have a camera that has a field of view of at least 270 degrees about the aircraft 205. The camera subsystem 217 can additionally or alternatively have a first camera mounted toward a port side of the aircraft (e.g., for left traffic operations), a second camera mounted toward a starboard side of the aircraft (e.g., for right traffic operations), a third camera mounted toward a nose portion of the aircraft (e.g., for straight-in approaches), and/or any other suitable cameras mounted at any other suitable portion of the aircraft 205.

The camera(s) of the camera subsystem 217 can thus be fixed in position. The camera(s) of the camera subsystem 217 can alternatively be adjustable in position based on flight paths of the aircraft 105 to the landing site. The camera subsystem 217 can thus include actuators coupled to the camera(s) of the camera subsystem 211 and/or position encoders coupled to the actuators, in relation to electronic control of camera positions. In relation to image stabilization, the camera(s) of the camera subsystem 217 can be coupled to image stabilization subsystems (e.g., gimbals) to reduce artifacts due to vibration or other undesired image artifacts that would otherwise be included in image data generated from the camera subsystems 217.

The camera subsystem 217 produces output images that have a characteristic resolution (e.g., associated with a sensor size), focal length, aspect ratio, and/or directionality (e.g., unidirectionality associated with 360-degree images), format color model, depth, and/or other aspects. The camera subsystem 217 can be configured for one or more of: monoscopic images, stereoscopic images, panoramic images, and/or any other suitable type of image output. Furthermore, while images are described, the camera subsystem 217 can be configured to output video data.

1.2.3 System—IMU Components

The subsystems 210 also include one or more inertial measurement units (IMUs) 212 for measuring and outputting data associated with the aircraft's specific force, angular rate, magnetic field surrounding the aircraft 205, and/or other position, velocity, and acceleration-associated data. Outputs of the IMU can be processed with outputs of other aircraft subsystem outputs to determine poses of the aircraft 205 relative to a landing site (or other target), and/or pose trajectories of the aircraft 205 relative to a landing site (or other target). The IMU 212 includes one or more accelerometers, one or more gyroscopes, and can include one or more magnetometers, where any or all of the accelerometer(s), gyroscope(s), and magnetometer(s) can be associated with a pitch axis, a yaw axis, and a roll axis of the aircraft 205.

The IMUs 212 are coupled to the aircraft and can be positioned internal to the aircraft or mounted to an exterior portion of the aircraft. In relation to measurement facilitation and/or post-processing of data form the IMU, the IMU can be coupled to a vibration dampener for mitigation of data artifacts from sources of vibration (e.g., engine vibration) or other undesired signal components.

The one or more IMUs 212 are components of, or communicatively connected to, an INS of the aircraft, which, for simplicity of description, is described with reference to the GPS subsystem 213 below. However, depending upon the embodiment, the INS may be its own independent subsystem of the aircraft. Alternatively, the aircraft may include an INS and not the one or more IMUs 212, e.g., an INS with its own sensors. Also for simplicity of description, the system is described henceforth with reference solely to the INS, though it is contemplated that alternative embodiments may employ one or more IMUs 212. The INS is described in greater detail with reference to FIG. 3.

1.2.5 System—GPS Components

The subsystems 210 include the GPS subsystem 213 coupled to the aircraft along with aircraft-mounted antennas tuned to frequencies at which ranging signals are transmitted by satellites. Although described as a GPS subsystem 213 herein, the subsystems 210 may alternatively include a different GNSS subsystem corresponding to a different GNSS system when the alternative GNSS system, such as Beidou or another described above, is instead used by the aircraft. As such, the techniques described herein with reference to the GPS subsystem 213 may be applied using a different GNSS subsystem, though for brevity and clarity the techniques described herein solely reference a GPS subsystem 213.

The GPS subsystem 213 includes a set of redundant GPS receivers, where each GPS receiver is capable of carrying out all GPS and augmented GPS functions (e.g., as described herein). The GPS subsystem 213 includes (e.g., for each GPS receiver) an internal GPS processor, radio frequency (RF) circuitry, a clock, and a data link (e.g., wireless data link, wired data link). The GPS subsystem 213 can include a display and can include any suitable number of channels (e.g., greater than 12 channels, less than or equal to 12 channels, etc.) for receiving and tracking signals from different satellites. The GPS subsystem 213 can be electronically coupled to an electrical system of the aircraft 205 for power and/or alternatively include an independent power source (e.g., for a portable configuration). The GPS subsystem 213 can further be coupled to other subsystems 210. The GPS 213 can additionally or alternatively be coupled to the FMS 250. The GPS subsystem 213 can include one or more inputs for differential corrections (e.g., using the RTCM SC-104 or GBAS formats) and/or can be configured to receive GPS-like signals from one or more augmentation systems or additional systems as listed above, e.g., a Satellite Based Augmentation System (SBAS). Furthermore, the GPS subsystem 213 can include architecture for relaying data (e.g., location-associated data, time-associated data, velocity-associated data, etc.) to other data processing devices using a NMEA 0183 protocol or any other suitable protocol (e.g., SiRF protocol, MTK protocol, etc.).

The GPS subsystem 213 can have one or more antennas coupled to the aircraft 205 (e.g., within the aircraft, mounted to the aircraft) and positioned so as to mitigate signal reflections (i.e., multipath) or interference from other portions of the aircraft 205 (e.g., structural features of the aircraft) and/or other subsystems associated with the aircraft 205.

In relation to the INS, the GPS subsystem 213 can also be communicatively coupled to INS as an INS-enabled (or IMU-enabled) GPS. In INS-enabled GPS configurations, the GPS subsystem 213 can thus include operational modes that output location-associated information and/or velocity-associated information-based outputs of the INS and a reference location of the aircraft 205 from the GPS, e.g., a most recent reference location from the GPS.

In relation to the GPS subsystem 213, the subsystems 210 can also include a multidirectional satellite transmission subsystem 214 (e.g., a multidirectional satellite radio) including relays for interfacing with one or more satellites including satellite 24. The satellite transmission subsystem 214 can thus include channels associated with the GPS subsystem 213 described above in relation to receipt and transmission of satellite signals associated with the GPS subsystem 213. The satellite transmission subsystem 214 can additionally or alternatively include channels associated with transmission and/or reception of satellite data for traffic avoidance in coordination with automatic dependent surveillance broadcast (ADS-B) functionality, for weather services (e.g., in relation to weather along flight path, in relation to winds aloft, in relation to wind on the ground, etc.), for flight information (e.g., associated with flight restrictions, for notices, etc.), and/or for any other suitable purpose. The satellite transmission subsystem 214 operates in approved frequency bands (e.g., bands approved through Federal Communications Commission regulations, bands approved through Federal Communications Commission advisory circulars, etc.). The system 200 can additionally or alternatively implement one or more other ground and/or space-based differential or augmentation systems, as listed above or otherwise.

1.2.6 System—Communication Components

The subsystems 210 also include a radio transmission subsystem 215 for communication with the aircraft 205, for transmission of aircraft identification information, or for transmission of other signals. The radio transmission subsystem 215 can include one or more multidirectional radios (e.g., bi-directional radios) onboard the aircraft, with antennas mounted to the aircraft in a manner that reduces signal transmission interference (e.g., through other structures of the aircraft). The radios of the radio transmission subsystem 215 operate in approved frequency bands (e.g., bands approved through Federal Communications Commission regulations, bands approved through Federal Communications Commission advisory circulars, etc.).

The communication-related components of the subsystems 210 can additionally or alternatively cooperate with or supplement data from other avionics components (e.g., the GPS subsystem 213), electrical components (e.g., lights), and/or sensors that support flight operations (e.g., in flight, during landing, on the ground, etc.), that support observability by other traffic, that support observability by other aircraft detection systems, that provide environmental information (e.g., pressure information, moisture information, visibility information, etc.) and/or perform other functions related to aircraft communications and observability.

1.3 System—Remote Components

As shown in FIG. 2, the system 200 can optionally include a remote station 220 that includes devices for wirelessly receiving data from and transmitting data to subsystems coupled to (e.g., onboard, the aircraft). The remote station 220 includes one or more multidirectional radios (e.g., bi-directional radios), with one or more antennas. The radios of the remote station operate in approved frequency bands (e.g., bands approved through Federal Communications Commission regulations, bands approved through Federal Communications Commission advisory circulars, etc.). In an embodiment, the remote station 220 is in communication with a data center 230 for storage and retrieval of data derived from subsystems of the aircraft 205 or useful to the aircraft, such as terrain maps. The data center uses storage and retrieval protocols and can use data encryption protocols for promoting security in relation to handling sensitive information pertaining to autonomous flight of the aircraft 205.

Depending upon the embodiment, the system 200 may include a plurality of remote stations 220. The system 200 may include a remote system 220 with which the aircraft 205 exchanges data, such as terrain maps. In an embodiment, the aircraft 205 stores one or more terrain maps locally. The terrain map includes geographical data that can used by the aircraft 205 in collaboration with a radar altimeter to generate a position solution, as described below. The system 200 may include a remote system 220 with which the aircraft exchanges data such as historic augmented system data. Alternatively, the aircraft 205 may store historic augmented system data locally.

The remote station 220 can also use communications technologies and/or protocols in relation to data transmission operations with the data center 230, subsystems of the aircraft 205, and/or the operator interface 240 described in more detail below. For example, the remote station 220 can have communication links using technologies such as Ethernet, 802.11, worldwide interoperability for microwave access (WiMAX), 3G, 4G, code division multiple access (CDMA), digital subscriber line (DSL), or other communication technologies. Examples of networking protocols used for communications with the remote station 220 include user datagram protocol (UDP) and/or any other suitable protocol. Data exchanged with the remote station 220 can be represented using any suitable format.

Furthermore, in relation to communications-related subsystems, if a communication does not operate as intended (e.g., a communication link fails), the aircraft 205 can be transitioned into a safety operation mode. In an example, in the safety operation mode, the aircraft 205 enters a holding pattern until operation of the communications-related subsystems are restored to proper operation or until the aircraft 205 can be operated safely/safely landed in another manner.

1.4 System—Conclusion

Variations of elements of the system 200 described above and shown in FIG. 2 can be configured in any other suitable manner. For instance, portions of one or more of: the navigation processor 216 onboard the aircraft 205, the FMS 250, the remote station 220, and/or the data center 230 can operate as a computing system that includes machine-readable instructions in non-transitory media for implementation of one or more techniques described herein.

In relation to flight control, the system 200 can include an electronic interface between the computing system (e.g., navigation processor 216, remote station 220) and an FMS 250 of the aircraft (e.g., as supported by the computing system), the electronic interface operable in a mode that transmits the set of instructions to the flight management system and controls operation of the aircraft. Depending upon the embodiment, the computing system and the FMS 250 may be the same component of the aircraft, or different aspects of the same component. One or more portions of the computing system described above can further include architecture for storing a database of navigation object characteristics relevant to flight paths of the aircraft 205, where the database of navigation object characteristics can include a high-resolution height map database of terrain, static objects, infrastructure associated with moving objects, passive and/or active markers, and/or other features below or in the path of the aircraft 205 during flight. The database can be accessed by portions of the computing system to facilitate portions of the techniques described herein.

While the system described above can implement embodiments, variations, and/or examples of the techniques described herein, the system can additionally or alternatively implement any other suitable method.

II. GPS Augmentation

Figure 3:
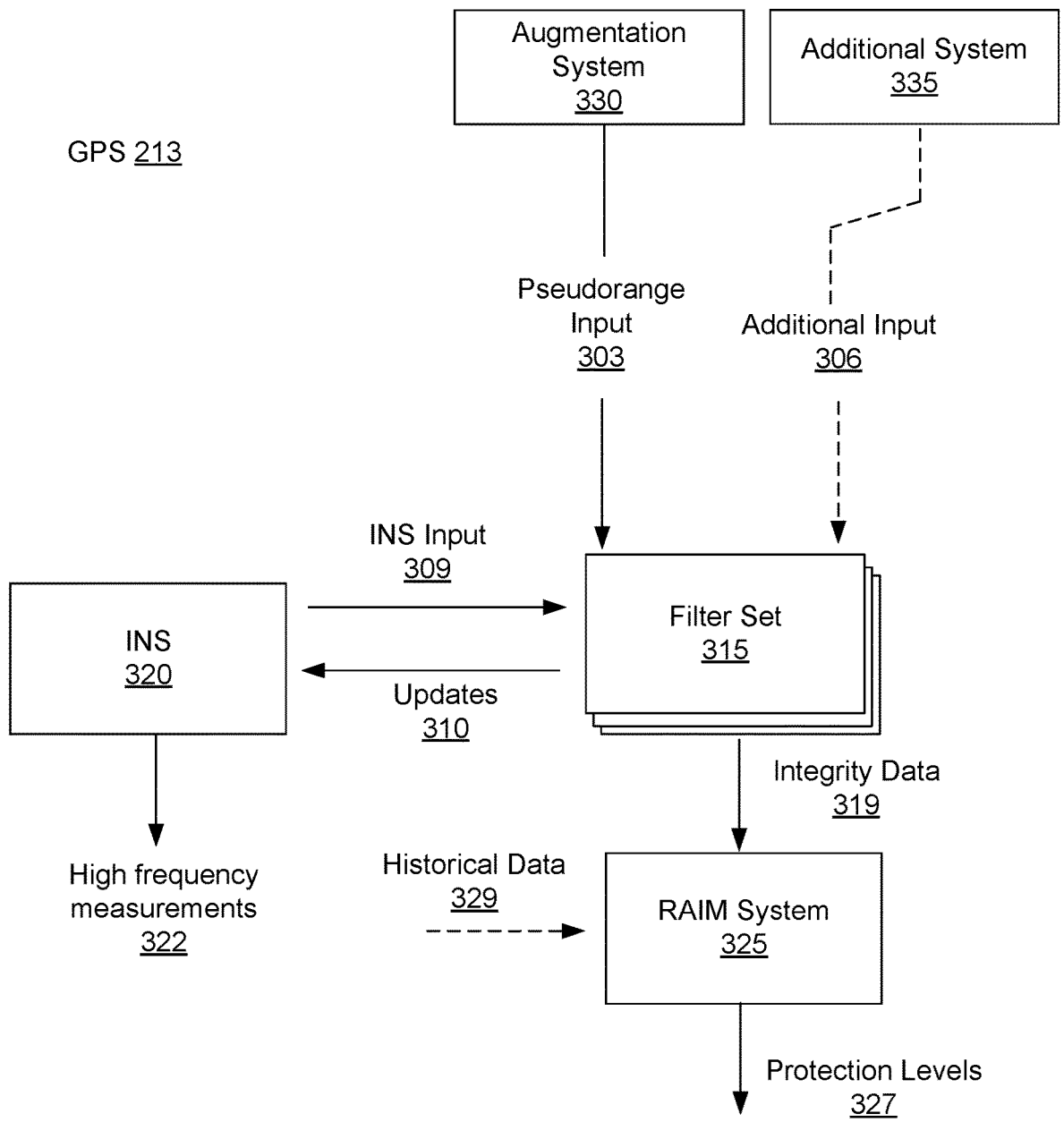
FIG. 3 is a block diagram illustrating a GPS with augmented RAIM, according to one embodiment.

FIG. 3 is a block diagram illustrating the GPS subsystem 213 with augmented RAIM, according to one embodiment. Although illustrated as the GPS subsystem 213 including the various components illustrated in the figure, in alternative embodiments one or more components illustrated in the figure may be separate subsystems of the aircraft 205 that exchange data with the GPS subsystem 213. Although described herein solely with reference to WAAS for clarity, the techniques put forth herein can be performed using a variety of augmented systems (and potentially one or more additional systems), such as those described above with reference to FIG. 2.

At a high level, the GPS subsystem 213 includes a set of tightly coupled filters, filter set 315, such as a set of parallel Kalman Filters; alternative filters may be employed without departing from the principles set forth herein. Depending upon the embodiment, one or more of the Extended Kalman filters (EKFs) may be Schmidt Extended Kalman filters. The filter set 315 receives corrected pseudorange inputs 303 from a GPS augmentation system 330 and INS inputs 309 (e.g., position-domain accelerations and angular rates) from an INS 320, e.g., as described above with reference to FIG. 2. The filter set 315 can also receive additional input 306 from one or more additional systems 335, such as a radar altimeter. The filter set 315 outputs updated position solutions 310 to the INS 320, which in turn produces high frequency measurements 322. The filter set 315 also outputs integrity data 319, which a RAIM system 325 uses to generate protection levels 327 and to monitor position solution integrity. The RAIM system 325 may also incorporate historical data 329, such as historical error data corresponding to the augmentation system 330.

Techniques described herein can provide for protection levels that are smaller than typical WAAS protection levels while maintaining the $10^{-7}$ integrity that WAAS achieves. With reduced protection levels, lower approach minima are enabled, and with the addition of radar altimeter measurements, automatic takeoff and landing operations can be performed. Currently, the lowest allowable approach minimum (decision height) for a WAAS user is 200 ft. In an embodiment, the filter set 315 uses only WAAS-corrected pseudorange inputs 303. These WAAS-corrected GPS pseudoranges are obtained from a minimum operational performance standard (MOPS)-compliant GPS-WAAS receiver.

The filter set 315 and INS 320 are tightly coupled. Tightly-coupled INS/GPS solutions can provide faster navigation outputs to guidance systems and are more robust in periods of poor GPS satellite visibility or geometry. Position-domain solution separation is accomplished by running the filter set 315 such that different filters exclude different subsets of GPS satellites. The baseline algorithm monitors for all possible single-satellite faults, so for n satellites, there are a total of (n+1) filters, n filters each with a different, single satellite measurement not included, and one filter with all measurements included. For example, filter i excludes GPS measurements from satellite i and never uses measurements from that satellite. In this way, its navigation solution is immune from any potential fault that satellite i experiences.

In addition to protecting against single satellite faults using parallel filters, the GPS subsystem 213 is also protected from faults in the GPS space segment and atmospheric anomalies by the inclusion of WAAS. The receiver does not only output WAAS-corrected pseudoranges, but also makes use of the WAAS-provided bounds on clock and ephemeris errors (in the broadcast User Differential Range Error) and ionospheric errors (in the broadcast Grid Ionospheric Vertical Error) for each satellite and ionospheric grid point (IGP) that are approved for use.

Each of the parallel filters in the filter set 315 produces a covariance associated with its position solutions which is used for computing protection levels. This covariance is a function of the bounding variance on each pseudorange (derived from WAAS and local error bounds), the bounding variance of the INS measurements, and the satellite geometry, which informs the measurement noise matrix, $R_k$, in each of the filters.

The standard Kalman filter formulation assumes that the measurement noise matrix, $R_k$, is zero-mean white noise. However, the residual errors following the application of WAAS corrections violate this assumption, as they are strongly correlated over time. The correlation times for atmospheric errors, $\tau_{atm}$, (assuming, for simplicity, a first-order Gauss-Markov model) are typically on the order of 15 minutes to 1 hour, while the correlation times of residual satellite clock and ephemeris errors, $\tau_{flt}$, are similar. The correlation time for the user range error, $\tau_{air}$, is roughly 100 seconds, as it is driven by the user smoothing time constant, which exceeds the time correlation of multipath errors for moving aircraft.

One way to account for correlation in the measurement errors is to scale the measurement noise matrix by the ratio of correlation time to measurement update interval. Despite the long correlation times of WAAS residual errors, significant benefit from averaging these errors within the filter will result if the filters are run throughout flights of 1 hour or more. However, if the filters are initialized or re-initialized several minutes before a critical operation such as the beginning of a takeoff or an approach and landing phase, this benefit would be minimal. In these cases, a simpler approach to modelling the long-time-correlated atmospheric and fast-and-long-term errors would be to treat them as biases for the duration of approach and landing.

This can be further improved by accounting for these errors using a Schmidt Kalman filter. These filters are sometimes referred to as "consider state" filters and account for these errors by treating them as unobservable states that nevertheless contribute to the filter covariance.

The four time-correlated range errors considered are (1) fast and long term correction residuals ($e_{flt}$), (2) ionospheric delay ($e_{iono}$) (3) airborne receiver errors ($e_{air}$), and (4) tropospheric errors ($e_{tropo}$). As explained above, the tightly-coupled INS-GPS filter set 315 incorporates GPS measurements at the pseudorange level (following the application of corrections from WAAS corrections or other augmentation systems). The pseudorange equation with these errors included is:

$$\rho_i = \sqrt{(x_i-x)^2+(y_i-y)^2+(z_i-z)^2}+b+e_{flt,i}+e_{iono,i}+e_{air,i}+e_{tropo,i}+\varepsilon_i$$

where $\rho_i$ is the pseudorange to the $i^{th}$ satellite, b is the user clock error, and $\varepsilon_i$ contains all other errors. These states cannot be estimated since they are individually indistinguishable from each other. If the four errors listed here were not correlated in time, they could simply be accounted for in the measurement noise covariance matrix of a normal EKF. Since they are, they are accounted for by incorporating them as consider states.

In an embodiment, in order to include all possibly usable GPS satellites in filter processing, the aircraft 205 simultaneously runs a number of filter instances equal to the number of satellites in the augmented satellite system's 330 constellation (e.g., 32) plus one. All but one of the filters in the filter set 315 are each associated with a particular satellite from the constellation, and excludes its associated satellite's data, while the last filter uses data from all satellites in the constellation.

Typically, only a smaller number of satellites will be or will have recently been in view of a particular user, so only the filters corresponding to those satellites will significantly differ from the filter including all satellite data. Those filters corresponding to satellites not recently in view will "exclude" an unused satellite and thereby appear very similar to the "all-satellites-healthy" filter.

By running all of these filters at once, filtering can be initialized at or before the beginning of each flight and be continued throughout the flight, including the approach and landing phase. This maximizes the benefit of filtering by averaging over long time scales and thus reducing slowly-changing GPS errors after WAAS corrections are applied. However, in order to prevent the effects of past measurement failures from lingering too long in filter "memory," in some embodiments, these filters are re-initialized periodically during the flight (e.g., once per hour), which lessens the benefit obtained from averaging. In addition, the need to continually maintain more than 30 filters can be a significant computational demand on the aircraft, e.g., on the GPS subsystem 213.

An alternative embodiment is to give up most of the benefit of averaging slowly-changing errors and instead only initialize the filters shortly before the approach phase begins.

In this case, only a smaller number of filters (e.g., about 12 to 18) are used, to include all satellites in view at the start of initialization and any others that may come into view during the approach. As noted previously, in this alternative, the slowly-changing WAAS residual errors that would ordinarily be included in the measurement covariance matrix $R_k$ are simply be treated as biases and added directly to the filter state covariance matrix $P_k$. In another alternative, these biases are modeled as "consider states" and treated appropriately regardless of when the filters are initialized. This allows the bias to be used regardless of the filter initialization procedure.

In one embodiment, these subset filter formulations only consider a single satellite being faulty, where the probability of two or more independent satellite faults being present at the same time (or a correlated constellation fault being present) is well below the $10^{-7}$ integrity risk allocation and has a sub-allocated integrity risk of less than $10^{-8}$.

In various embodiments, satellites that newly rise into view of the aircraft 205 are de-weighted by their initial subset filter covariance matrix and contribute more to the position solution as their covariance converges toward steady state. Satellites that are lost from view and re-acquired have their subset filters re-initialized in a similar fashion, but if the outage is short, the initial covariance matrix of a re-acquired satellite is a function of the covariance before the dropout. Depending on the duration of the outage, this initial covariance will be larger than the pre-dropout covariance but smaller than that of a satellite newly risen into view.

Satellites that are excluded by the aircraft 205 (or by WAAS UDRE or GIVE indicators) are treated differently because they are at that point presumed to be faulted until proven otherwise. An excluded satellite can be re-admitted by passing a check at a later time (e.g., after having its filter re-initialized and re-converged). Satellites whose exclusion is triggered by WAAS are re-admitted when updated WAAS UDRE and GIVE messages allow their use and the re-admittance threshold is passed. Note that satellites excluded after the approach and landing phase has begun are unlikely to be re-admitted before it ends.

As described above, the aircraft attempts to exclude faulty measurements, such as measurements causing error to exceed an alert limit. As such, not only the WAAS system, but also the RAIM system of the aircraft (e.g., the GPS subsystem 213), can trigger a satellite exclusion. This represents a presumed fault which can be recovered (i.e., re-admitted for use) as described below.

In an embodiment, while the filters propagate position and velocity states at a fast update rate (e.g., 50 Hz), WAAS-corrected GPS measurements are introduced into the filters at a slower rate (e.g., 5 Hz). WAAS receiver algorithms propagate corrections from the times that they are received to the time that measurements are made and check that this interval is not too large. Filter measurement updates are synchronized to the WAAS receiver time tags to avoid the need for any additional latency adjustments by the filters. In some embodiments, protection level calculations can be carried out separately along separate axes, e.g., along-track and cross-track, as described above with reference to FIG. 1C.

A satellite k excluded by the aircraft can be re-admitted for use in positioning after its filter has been re-initialized and re-converged. For re-admission, a detection test must be passed for that satellite, but the threshold that applies is not the normal one (e.g., 1.0) but instead a much tighter one (e.g., 0.3). A tighter threshold applies due to the fact that a satellite previously excluded as faulted is deemed faulted with a prior probability approaching 1.0 until it is re-admitted. Therefore, to obtain the same level of integrity on that satellite as one that has not been excluded (and thus has a low prior fault probability), the implied missed-detection probability of the detection test must be much lower as well. This is achieved (at the expense of a higher probability of false rejection) by the tighter threshold ratio.

The requirement on the time to alert (TTA) for GBAS approaches with minima under 200 ft (Category II/III) is 2 seconds. The WAAS TTA is 6 seconds, meaning that WAAS alone may not alert the user soon enough of an error for these approaches. Because the filters are run on the aircraft 205 with updates faster than once per second, it can alert a rapidly growing fault in less than 2 seconds, enabling the aircraft 205 to meet the TTA requirements for approaches below 200 ft.

Certain slowly growing faults, such as very slow clock run-offs, may only be detectable by WAAS. In this case, WAAS would not be able to detect these faults until at least 6 seconds after they become hazardous, but the very low probability of these faults and their very slow growth rate would make them a non-factor over the relatively short time frame of an approach. While it is theoretically possible for a slow-growing fault to become hazardous to an automated landing and not be detected and excluded by WAAS within 2 seconds, the probability of such an event is well below the $10^{-7}$ integrity risk requirement. In contrast, faster growing faults that become hazardous very quickly are more likely and potentially problematic during an approach and landing, but these would be detected in less than 2 seconds.

Historical WAAS performance data, e.g., error data, 329 can be factored by the aircraft 205 into protection level calculations. The standard deviations in the position domain are driven by the WAAS range-domain error standard deviations applied to each pseudorange within the measurement update in the filter set 315. The RAIM system 325 is designed with knowledge of the maximum ratio of observed error to computed protection level over a large prior set of observed error values. This ratio, or a value proportional to this ratio, is used to scale the protection level calculations.

In the two horizontal directions (along-track and cross-track), the improved protection levels support the entire approach, landing, and rollout. In the vertical direction, the improved protection levels support lower minima than the currently accepted 200 ft decision height for an LPV-200 approach. This system may support 100 ft decision heights. At 150 ft, additional input 306, e.g., radar altimeter measurements, can be phased into the filters of filter set 315. Under 100 ft Height Above Touchdown (HAT), radar altimeter measurements will enhance vertical navigation accuracy, further reduce VPLs, and allow for automated landings. The radar altimeter provides aircraft 205 height above ground level, which is compared to a terrain map that provides the height of the terrain as a function of latitude and longitude relative to the WGS-84 ellipsoid, which allows for the radar altimeter measurements to be converted to altitude above the ellipsoid, then into Earth Centered Earth Fixed (ECEF) or East-North-Up (ENU) coordinates. In an embodiment, terrain maps are obtained from surveys of airport runway areas and pre-threshold domains.

In the filter set 315, the radar altimeter measurements can be added as a virtual pseudorange measurement with a component only in the vertical direction and a zero clock term. This addition to the filter is implemented in the observation matrix, $H_n$, where the bottom row is augmented to include the radar measurement. A radar altimeter measurement has a variance that is a function of the uncertainty of the radar altimeter and the accuracy of the terrain map. In an embodiment, this value is scaled such that zero-mean Gaussian extrapolations of radar altimeter errors can be shown to bound actual radar altimeter errors at the very low probabilities reflected by the protection levels.

III. Techniques for Augmenting RAIM

3.1 Method—Augmented RAIM

Figure 4:
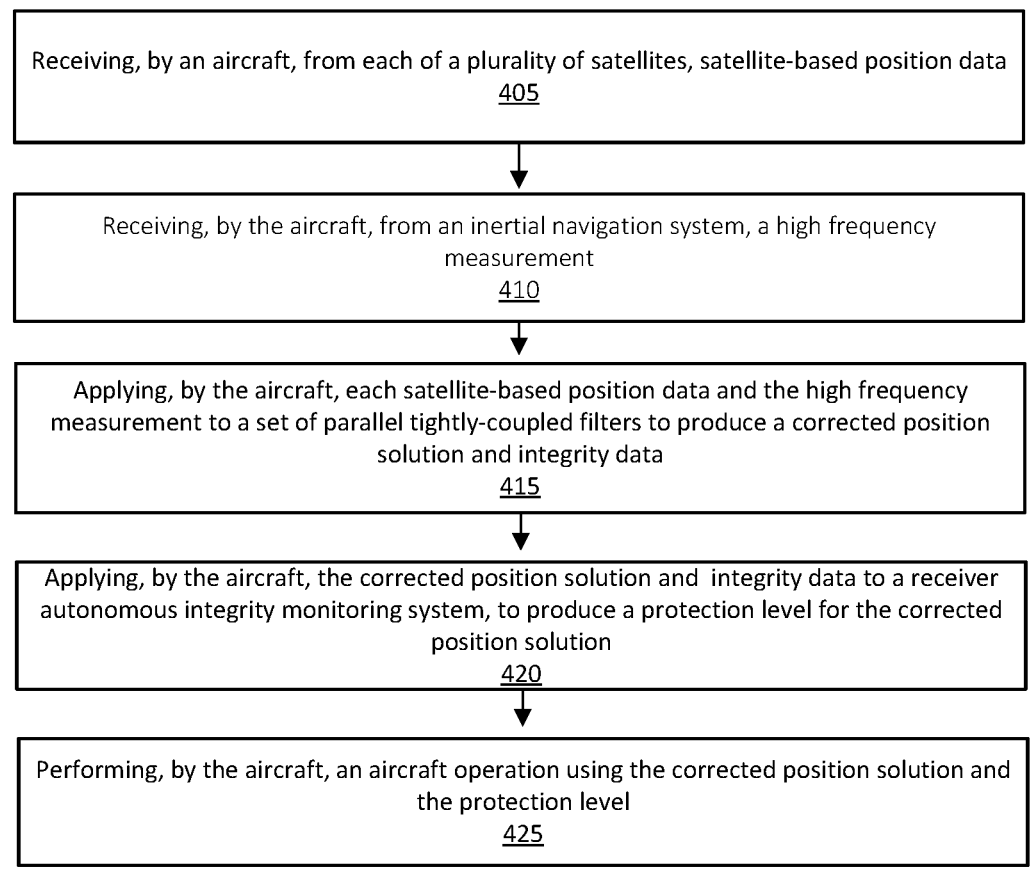
FIG. 4 is a flowchart illustrating a process for augmenting RAIM, according to one embodiment.

FIG. 4 is a flowchart illustrating a process for augmenting solution separation based RAIM according to one embodiment. The process can be implemented by one or more embodiments of the system 200 described above. An aircraft 205 receives 405, from each of a plurality of satellites of an augmentation system, satellite-based position data comprising corrected pseudorange measurements, carrier-phase measurements, error bounds, and/or integrity warnings (if any). The aircraft receives 410, from an inertial navigation system, high-frequency measurements comprising linear accelerations and/or angular rates. The aircraft applies 415 each augmentation system measurement, each error bound, and the high frequency INS measurements to a set of parallel extended Kalman filters (in one set of embodiments, Schmidt extended Kalman filters), to produce an updated position solution and integrity data. The aircraft applies 420 the integrity data to a receiver autonomous integrity monitoring system to produce protection levels for the updated position solutions. The aircraft performs 425 an aircraft operation using these frequently updated position solutions and protection levels. The aircraft can compare the protection levels to the respective alert limits for each element of the operation being conducted to ensure integrity of each GPS update epoch.

3.2 Method—Landing Technique

Figure 5:
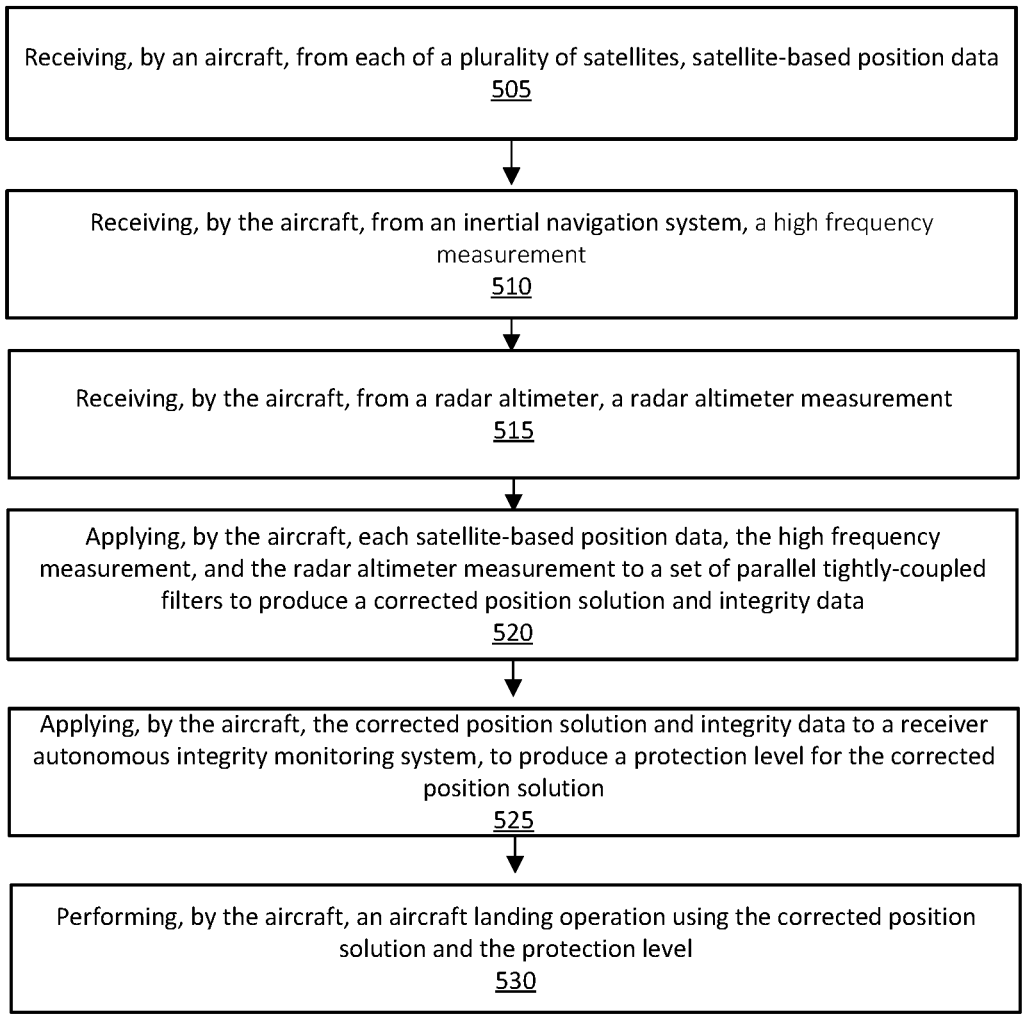
FIG. 5 is a flowchart illustrating a process for augmenting RAIM, according to a second embodiment.

FIG. 5 is a flowchart illustrating a process for augmenting RAIM according to a second embodiment. The process can be implemented by one or more embodiments of the system 200 described above. An aircraft 205 receives 505 from each of a plurality of satellites of an augmentation system, satellite-based position data comprising a precise position solution and error data. The aircraft receives 510 from an inertial navigation system, a high frequency measurement comprising a linear acceleration and an angular rate 410. The aircraft receives 515, from a radar altimeter, an altitude measurement (e.g., in Earth Centered Earth Fixed (ECEF) or East-North-Up (ENU) coordinates), e.g., where the altitude measurement was compared to a terrain map to identify the set of coordinates. The aircraft applies 520 each precise position solution, each error data, the high frequency measurement, and the altitude measurement to a set of parallel Schmidt extended Kalman filters to produce a corrected position solution and integrity data. The aircraft applies 525 the integrity data to a receiver autonomous integrity monitoring system, to produce a protection level for the corrected position solution. The aircraft performs 530 an aircraft landing operation using the corrected position solution and the protection level.

IV. Conclusion

The system and methods described can confer benefits and/or technological improvements, several of which are described herein. For example, the system and method employ non-traditional use of sensors to determine position solutions of an aircraft while the aircraft is in flight toward a landing site. Landing an aircraft, in particular, requires dynamic monitoring and control of aircraft operational states, and the method and system employ sensors in a novel manner for control of flight of aircraft (e.g., fixed wing aircraft, other aircraft) in relation to landing.

Any computing systems and/or physical components of the aircraft 205 referred to in the specification may include redundant computing systems and/or physical components. In this manner, the availability, continuity, and integrity of aircraft systems for automated approaches and landings can be improved.

The system and method also include functionality for evaluating performance of other subsystems of the aircraft (e.g., navigation systems, etc.) to improve their performance or otherwise improve safety of a flight operation.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, one implementation of which is set forth in the following claims.

What is claimed is:

1. A computer-implemented method of an aircraft, comprising:
    receiving, by the aircraft, from each of a plurality of satellites, satellite range measurements;
    receiving, by the aircraft, from one or more global navigation satellite system (GNSS) augmentation systems, one or more corrections to the satellite range measurements and error bounds on the one or more corrections;
    generating, by the aircraft, satellite-position data based on the satellite range measurements, the one or more corrections to the satellite range measurements, and the error bounds on the one or more corrections;
    receiving, by the aircraft, from an inertial navigation system, a high frequency measurement;
    receiving, by the aircraft, from a radar altimeter, a radar altimeter measurement of a height of the aircraft above ground level;
    generating, by the aircraft, an altitude measurement of the aircraft by comparing a terrain map that is indicative of a height of a terrain above a reference coordinate frame with the radar altimeter measurement of the height of the aircraft above the terrain;
    applying, by the aircraft, each satellite-based position data, the high frequency measurement, and the altitude measurement of the aircraft based on the comparison of the radar altimeter measurement and the terrain map to a set of parallel tightly-coupled filters to produce a corrected position solution and integrity data;
    applying, by the aircraft, the corrected position solution and integrity data to a receiver autonomous integrity monitoring system, to produce a protection level for the corrected position solution;
    retrieving historical data of the GNSS augmentation systems;
    comparing actual past errors from the historical data and the corresponding error bounds;
    deriving updated error bounds of the one or more corrections based on ratios between the actual past errors and the corresponding error bounds;
    adjusting the protection level for the corrected position solution using the updated error bounds; and
    performing, by the aircraft, an aircraft operation including one of aircraft approach and landing or take off and departure using the corrected position solution and the adjusted protection level.

2. The computer-implemented method of claim 1,
    wherein one tightly-coupled filter of the set of parallel tightly-coupled filters uses satellite-based position data from all of the satellites of the plurality of satellites, and
    wherein all other of the tightly-coupled filters in the set of parallel tightly-coupled filters each excludes satellite-based position data from one or more satellites of the plurality of satellites.

3. The computer-implemented method of claim 2,
    wherein each of the other of the tightly-coupled filters in the set of parallel tightly-coupled filters excludes satellite-based position data from exactly one satellite of the plurality of satellites, each of the other tightly-coupled filters excluding satellite-based position data from a different satellite of the plurality of satellites.

4. The computer-implemented method of claim 1, wherein the set of parallel tightly-coupled filters comprises a number of tightly-coupled filters equal to a total number of satellites of the plurality plus one.

5. The computer-implemented method of claim 1, further comprising:
    determining, by the aircraft, that a particular satellite of the plurality of satellites is no longer usable; and
    terminating, by the aircraft, a tightly-coupled filter of the set of parallel tightly-coupled filters that corresponds to the particular satellite.

6. The computer-implemented method of claim 5, wherein determining, by the aircraft, that the particular satellite is no longer usable, comprises determining, by the aircraft, that the particular satellite is no longer in view.

7. The computer-implemented method of claim 1, further comprising:
    determining, by the aircraft, that a new satellite is usable; and
    initiating, by the aircraft, a new tightly-coupled filter into the set of parallel tightly-coupled filters that corresponds to the new satellite.

8. The computer-implemented method of claim 7, wherein determining, by the aircraft, that the new satellite is usable, comprises determining, by the aircraft, that the new satellite is in view.

9. The computer-implemented method of claim 1, further comprising:
    determining, by the aircraft, using the receiver autonomous integrity monitoring system, that a particular satellite of the plurality of satellites is faulty; and
    adjusting, by the aircraft, the set of parallel tightly-coupled filters to ignore satellite-based position data received from the particular satellite.

10. The computer-implemented method of claim 9, further comprising:
    determining, by the aircraft, using the receiver autonomous integrity monitoring system, that the particular satellite of the plurality of satellites is no longer faulty; and
    adjusting, by the aircraft, the set of parallel tightly-coupled filters to use satellite-based position data received from the particular satellite.

11. The computer-implemented method of claim 1, further comprising:
    receiving, by the aircraft, additional input from an additional system; and
    applying the additional input to the set of parallel tightly-coupled filters.

12. The computer-implemented method of claim 1, wherein each of the parallel tightly-coupled filters is an extended Kalman filter.

13. The computer-implemented method of claim 12, wherein each of the Kalman filters is a Schmidt extended Kalman filter.

14. The computer-implemented method of claim 1, wherein the protection level for the corrected position solution comprises a horizontal protection level that is transposed into an along-track direction and a cross-track direction with respect to a runway of the aircraft, the along-track direction having an error limit that is looser than an error limit of the cross-track direction.

15. The computer-implemented method of claim 1, wherein the GNSS augmentation systems include at least one of a Satellite-based Augmentation System (SBAS) or a Ground-based Augmentation System (GBAS).

16. A non-transitory computer-readable storage medium storing computer program instructions executable by a processor to perform operations of an aircraft, the instructions comprising instructions to:
- receive, by the aircraft, from each of a plurality of satellites, satellite range measurements;
- receive, by the aircraft, from one or more global navigation satellite system (GNSS) augmentation systems, one or more corrections to the satellite range measurements and error bounds on the one or more corrections;
- generate, by the aircraft, satellite-position data based on the satellite range measurements, the one or more corrections to the satellite range measurements, and the error bounds on the one or more corrections;
- receive, by the aircraft, from an inertial navigation system, a high frequency measurement;
- receive, by the aircraft, from a radar altimeter, a radar altimeter measurement of a height of the aircraft above ground level;
- generate, by the aircraft, an altitude measurement of the aircraft by comparing a terrain map that is indicative of height of a terrain above a reference coordinate frame with the radar altimeter measurement of the height of the aircraft above the terrain;
- apply, by the aircraft, each satellite-based position data, the high frequency measurement, and the altitude measurement of the aircraft based on the comparison of the radar altimeter measurement and the terrain map to a set of parallel tightly-coupled filters to produce a corrected position solution and integrity data;
- apply, by the aircraft, the corrected position solution and integrity data to a receiver autonomous integrity monitoring system, to produce a protection level for the corrected position solution;
- retrieve historical data of the GNSS augmentation systems;
- compare actual past errors from the historical data and the corresponding error bounds;
- derive updated error bounds of the one or more corrections based on ratios between the actual past errors and the corresponding error bounds;
- adjust the protection level for the corrected position solution using the updated error bounds; and
- perform, by the aircraft, an aircraft operation including one of aircraft approach and landing or take off and departure using the corrected position solution and the adjusted protection level.

17. The non-transitory computer-readable storage medium of claim 16,
- wherein one tightly-coupled filter of the set of parallel tightly-coupled filters uses satellite-based position data from all of the satellites of the plurality of satellites, and
- wherein all other of the tightly-coupled filters in the set of parallel tightly-coupled filters each excludes satellite-based position data from one or more satellites of the plurality of satellites.

18. The non-transitory computer-readable storage medium of claim 16, wherein the set of parallel tightly-coupled filters comprises a number of tightly-coupled filters equal to a total number of satellites of the plurality plus one.

19. The non-transitory computer-readable storage medium of claim 16, the instructions further comprising instructions to:
- determine, by the aircraft, that a particular satellite of the plurality of satellites is no longer usable; and
- terminate, by the aircraft, a tightly-coupled filter of the set of parallel tightly-coupled filters that corresponds to the particular satellite.

20. The non-transitory computer-readable storage medium of claim 16, the instructions further comprising instructions to:
- determine, by the aircraft, that a new satellite is usable; and
- initiate, by the aircraft, a new tightly-coupled filter into the set of parallel tightly-coupled filters that corresponds to the new satellite.

21. The non-transitory computer-readable storage medium of claim 16, the instructions further comprising instructions to:
- determine, by the aircraft, using the receiver autonomous integrity monitoring system, that a particular satellite of the plurality of satellites is faulty; and
- adjust, by the aircraft, the set of parallel tightly-coupled filters to ignore satellite-based position data received from the particular satellite.

* * * * *